United States Patent [19]
Martel, Jr. et al.

[11] Patent Number: 5,251,292
[45] Date of Patent: Oct. 5, 1993

[54] METHOD AND APPARATUS FOR AN EQUATION EDITOR

[75] Inventors: Joseph Martel, Jr., Orem; David C. Moon, Alpine, both of Utah

[73] Assignee: WordPerfect Corporation, Orem, Utah

[21] Appl. No.: 557,946

[22] Filed: Jul. 25, 1990

[51] Int. Cl.$^5$ .............................................. G06F 15/20
[52] U.S. Cl. ...................................... 395/150; 395/147
[58] Field of Search ................................ 364/518–521, 364/513, 488, 491

[56] References Cited

U.S. PATENT DOCUMENTS 4,962,475 10/1990 Hernandez et al. ............. 364/521 X
4,980,840 12/1990 Yin et al. ............................. 364/518

*Primary Examiner*—Gary V. Harkcom
*Assistant Examiner*—Almis Jankus
*Attorney, Agent, or Firm*—Weil, Gotshal & Manges

[57] ABSTRACT

A method and apparatus carried out on a digital computer for creating and editing mathematical equations in a printed document is disclosed. This invention allows the user of a wordprocessing program to create and edit mathematical equations in an efficient and flexible manner through use of a user interface which includes an editing window, a display window, and a palette window. The editing window allows the user to input a textual description of the equation, the palette window provides an alternative method of entering the textual description of the equation by displaying the characters and commands that may be used, and the display window displays the equation as it appears in its final printed form. The textual description for an equation is entered by the user through keyboard characters, extended characters, and by selecting editing commands and characters from the palette window, and the method and apparatus of the present invention processes the textual description and provides simultaneous visual representations of both the textual descriptions and the equations as they will appear in the final printed form.

4 Claims, 2 Drawing Sheets $$f(x) = \sqrt{\frac{x^2}{2\alpha}}$$

FUNC f(X) = SQRT {X SUP 2 OVER {2 alpha}}

| Commands |
|---|
| OVER |
| SUP or ^ |
| SUB OR _ |
| SQRT |
| NROOT |
| FROM |
| TO |
| LEFT |
| RIGHT |
| STACK |
| STACKALIGN |
| MATRIX |
| FUNC |
| UNDERLINE |
| OVERLINE |
| { |
| } |
| HORZ |
| VERT |

Screen Redisplay; List Commands; Switch Window; Setup Options     500%

| | Commands |
|---|---|
| $$f(x) = \sqrt{\frac{x^2}{2\alpha}}$$ | OVER<br>SUP or ^<br>SUB OR _<br>SQRT<br>NROOT<br>FROM<br>TO<br>LEFT<br>RIGHT<br>STACK |
| FUNC f(X) = SQRT {X SUP 2 OVER {2 alpha}} | STACKALIGN<br>MATRIX<br>FUNC<br>UNDERLINE<br>OVERLINE<br>{<br>}<br>HORZ<br>VERT |
| Screen Redisplay; List Commands; Switch Window; Setup Options    500% | |

Figure 1

METHOD AND APPARATUS FOR AN EQUATION EDITOR

BACKGROUND OF THE INVENTION

1. Field of the Invention

The invention relates to computerized wordprocessing technology and specifically, to a process and apparatus carried out on a digital computer for creating and editing mathematical equations in printed documents.

"Wordprocessing" involves the use of a digital computer to manipulate printed characters in creating and editing documents. Such documents can be displayed electronically on a computer display screen or printed on hardcopy. This patent application was created using a wordprocessing program ("wordprocessor"). Manipulation of data in the form of printed characters is, indeed, a fundamental tool for human interaction with computers. Input devices such as keyboards provide the mechanism for feeding information to the computer, while output devices, such as video display terminals and printers, provide the mechanisms for viewing the results. Wordprocessors are a fundamental and vital tool of modern business.

Wordprocessors range in functionality from simple "text editors," which do no more than reproduce on the display screen the user's keyboard input, to sophisticated "desktop publishers," which enable the user to create, display, and print sophisticated, publication quality documents. An "equation editor" is a method implemented in software that is used to create and edit mathematical equations and which may be a component of a wordprocessor. Mathematicians, economists, businesspersons, and others who frequently utilize mathematical equations often need to incorporate those equations into printed documents such as reports, articles, and other papers. Incorporating complex mathematical equations into standard textual documents for printing has long been a difficult or even impossible undertaking. Because equations contain many non-standard characters and because those characters are often formatted in a complex manner, they are far more difficult to create and print than standard text.

The ability to create and manipulate equations in documents with an equation editor is partially constrained by the keyboard. Standard computer keyboards contain a character set including the letters "a" through "z", numbers "0" through "9", various commonly used characters such as commas, periods, semicolons, and apostrophes, cursor control keys such as "Page Up", "Page Down", and arrow keys, and ten or twelve special function keys. Standard computer keyboards do not contain many unique characters or symbols frequently used in mathematical equations. Therefore, unlike ordinary text, equations cannot be typed directly into documents using only keyboard characters. For example, while a simple equation such as can be created directly from keyboard characters, a more complex equation such as $$x = \frac{-b \pm \sqrt{b^2 - 4ac}}{2a}$$

cannot be created directly from keyboard characters. Thus, the incorporation of equations into documents created with a wordprocessor requires the use of at least two components: (1) a form of textual description of equations and (2) a "formatter" to translate the textual description into the actual printed form of the equation. For example, even a simple equation such as $$\frac{a}{b}$$

cannot be typed directly from the keyboard and therefore must be created using a textual description such as "a OVER b" which can be translated and printed in its equation form. An equation such as $$f'(x) = \lim_{h \to 0} \frac{f(x + h) - f(x)}{h}$$

can be created using a textual description such as "FUNC f'(x)=lim—(h→0) {(FUNC f(x+h)−FUNC f(x)}OVER h}".

A sophisticated equation editor also automatically formats equations, performing such tasks as automatic sizing of equation elements such as the root sign or the horizontal separator for division, and the vertical extension of "delimiters" (growing parentheses, brackets) around the sub-equations they enclose. For example, in the equations $$\sqrt{a} \quad \text{and} \quad \sqrt{\left(\frac{a+b}{c+d}\right)}$$

the equation editor adjusts the size of the square root sign and the parentheses to fit the equation inside. By automatically performing these awkward and time-consuming tasks, the equation editor frees the user to perform other less tedious tasks.

2. Brief Description of Prior Art

Prior art equation editors, such as TeX, Microsoft Word for the Apple MacIntosh computer and for the Microsoft Windows environment, Lotus Manuscript and EQN for Unix systems all include a method for describing equations textually and an equation formatter for translating the textual description into the printed form of the equation. However, prior art equation editors provide neither an editing methodology which allows the efficiency and flexibility of the present invention in creating textual descriptions of equations nor a window in the same display interface to display the final printed form of the equation at the same time as its textual description is being edited. The present invention uniquely combines multiple equation editing components into a single user interface, including an editing window for manipulating the textual description of an equation, a display window for viewing the printed form of the equation, and a palette window for selecting characters and commands used in describing the equation.

SUMMARY OF THE INVENTION

A method and apparatus carried out on a digital computer for creating and editing mathematical equations in a printed document is disclosed. This invention allows the user of a wordprocessor to create and edit mathematical equations in an efficient and flexible manner through use of a user interface which includes an editing window, a display window, and a palette window. The editing window allows the user to input a textual description of the equation, the palette window provides an alternative method of entering the textual description of the equation by displaying the characters and commands that may be used, and the display window displays the equation as it appears in its final printed form.

This invention also provides several methods for creating the textual description of the equation including direct textual input of keyboard characters, pre-defined key sequences for extended characters (non-ASCII characters), commands for printing and formatting unique mathematical symbols, and selection of input from the palette window.

Finally, this invention enables the user to view an equation in the display window from 25% to 1000% of its actual printed size and to easily move the entire equation to different locations in the document.

BRIEF DESCRIPTION OF THE DRAWINGS

FIG. 1 provides an overview of the equation editor system.

DESCRIPTION OF AN ILLUSTRATIVE EMBODIMENT

Figure 2:
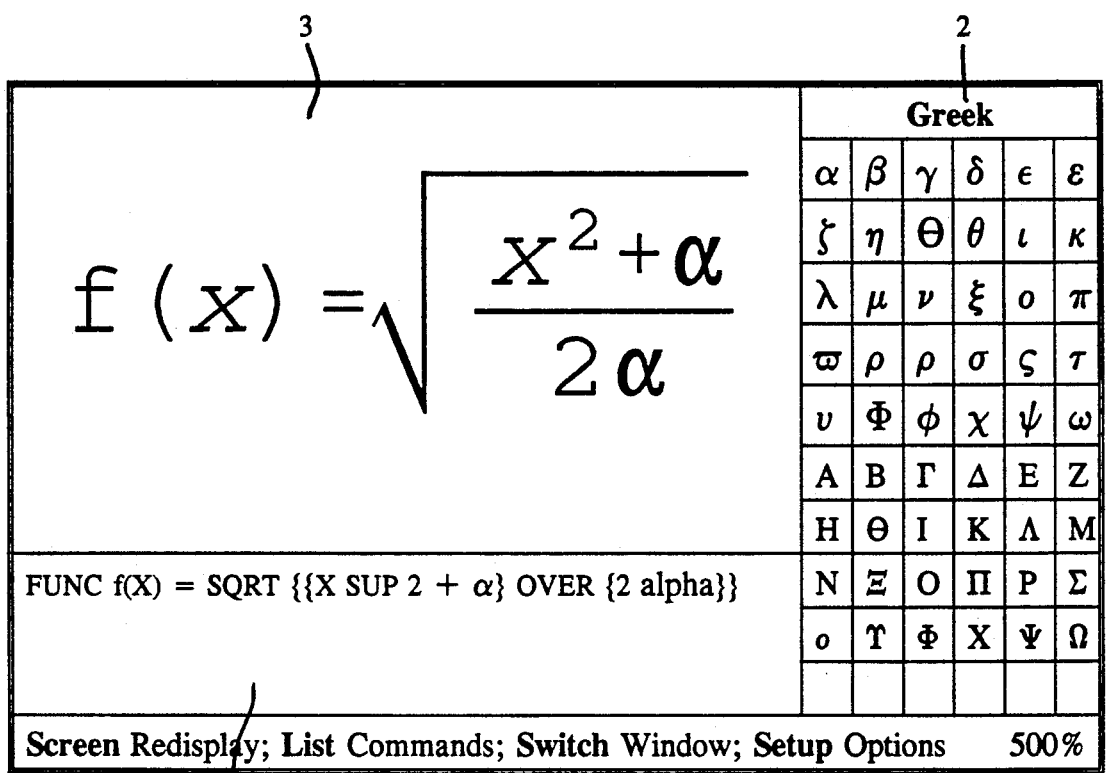
FIG. 2 is the multi-window equation editor user interface.

While this invention can be carried out on most digital computers, this description is confined to implementation on an IBM PC or compatible computer which uses a microprocessor in the Intel 8086/8088 family of microprocessors (e.g., 80286, 80386) and the DOS operating system. Also, while the invention can be implemented independently as a separate computer program, the preferred embodiment is implemented as a component of a wordprocessor.

Equations are created in a document by using a combination of characters, mathematical symbols, and commands. Commands are entered into the textual description of an equation in order to generate equation structures and mathematical symbols that cannot be generated directly by the keyboard. For example, the command "SQRT" is used in the textual description "SQRT x" to generate the square root symbol $$\sqrt{x}$$

and the commands SUM, FROM, TO, INF, and SUP are used in the textual description "SUM FROM {k=0} TO INF×SUP k" to generate the summation equation:

$$\sum_{k=0}^{\infty} x^k$$

FIG. 1 provides an overview of the equation editor system. A computer containing a microprocessor 21 with memory 22 and an I/O circuit 23 for handling data input and output executes the equation editor application program 24. The user interface of the equation editor application is displayed on the display monitor 25. The user enters the textual description of an equation through the input device 26. The I/O circuit 23 retrieves the input and places it in memory 22 for the equation editor application program 24 to process. The equation editor application 24 lexically scans and parses the textual description (see below) and generates data for printing the equation which is sent by the microprocessor 21 through the I/O circuit 23 to be displayed on the display monitor 25. Alternatively, data for the printed form of the equation may be sent through the I/O circuit 23 to a printer 28 for printing in a document. The textual description of the equation may also be sent through the I/O device 23 to the storage device 27 for permanent storage.

Referring to FIG. 2, the equation editor includes three separate "windows" in a single display screen: an editing window 1 for manipulating the textual description of an equation, a palette window 2 for selecting characters and commands used in editing the equation, and a display window 3 for displaying the printed form of the equation. A "window" is a discrete part of the display screen with a function different from the remainder of the display screen. Only one window may be accessed at a time and the user may switch control among the three windows by pressing pre-defined keys. In the preferred embodiment, the user may switch control from the editing window to the palette window by pressing the F5 key and from the editing window to the display window by pressing "Control-F3" ("Control" and F3 keys pressed simultaneously). The user may then switch back to the editing window from either the display window or the palette window by pressing the F7 key. Other keys could be used to switch control among windows; the present set was chosen because of their similarity with keystrokes utilized in the wordprocessor of which the preferred embodiment of the present invention is a part. Alternatively, if a "mouse" device is attached to the computer, it can be used to activate each of the windows.

The editing window 1 is used to edit the textual description of an equation, which is present in the editing window at all times while an equation is being edited. The textual description of the equation is stored in memory during the equation editing process. When the user terminates the equation editor session, the textual description is stored in a file as part of the wordprocessing document on a storage medium such as a magnetic disk. If the user wishes to edit the equation at a later time, the textual description is simply read out of the file and into memory to allow further modification. This textual description then serves as the "source code" describing the equation. The process of converting the textual description into its printed equation form is described below in the section discussing the display window.

This invention provides a new and extremely flexible method for editing the textual description of an equation. First, a textual description can be created through the normal input mode by typing characters directly from the keyboard. For example, the equation "a+b" could be input using only characters found on a standard keyboard. Second, in the preferred embodiment, characters which are recognized by the wordprocessor but are not found on a standard keyboard, called "extended characters," can be inserted into the textual description of an equation through a pre-defined sequence of keystrokes. FIG. 2 contains a list of extended character sets in the preferred embodiment. Each extended character is represented by a pair of numbers, the first indicating the "character set" to which the extended character belongs, and the second representing the number of the character within the character set. For example, the greek letter alpha ("α") can be inserted into the textual description of the equation in the editing window by typing the key sequence "Control-2,8,1", where "Control-2" indicates that an extended character follows, "8" indicates the extended character set number, and "1" indicates the number of the character within the set. Third, the invention provides the user with the option of inserting extended characters into the equation by typing the name of the character. For example, in the preferred embodiment, the greek letter "α" can be inserted into the equation by typing "alpha" into the textual description of the equation.

Referring to FIG. 2, the palette window 2 provides an alternative method for inserting extended characters and keywords into the textual description of an equation. The user can access the palette window from the editing window by pressing a pre-defined key (F5 in the currently preferred embodiment). The preferred embodiment of the palette window contains eight separate "menus," each with a list of characters or keywords that may be selected and inserted into the textual description of the equation. FIG. 4 contains a list of the contents of the palette window menus, each containing a unique group of characters or keywords. A particular menu may be selected by pressing the "Page Down" key to display the next menu or the "Page Up" key to select the previous menu in the sequence of eight palette menus.

The keywords in the palette menus represent commands used by the equation editor in creating various forms of equations. For example, the keyword "OVER" directs the equation editor to create a fraction by drawing a horizontal line between the designated numerator and denominator, "SQRT" directs the equation editor to create a square root symbol, and "INT" directs the equation editor to create an integral symbol.

The characters and keywords in each menu of the palette window may be viewed by using the arrow keys to move to the next item in the menu. In the preferred embodiment, the characters and keywords are highlighted in reverse video, one at a time, as the arrow keys are pressed. A keyword or the text form of a character, e.g., "alpha," may be selected and inserted into the textual description by pressing the "Enter" key when the desired character or command is highlighted in the palette window. Alternatively, the character form, e.g., "α," may be selected and inserted into the textual description by pressing "Control-Enter."

The palette entries are specified in a file stored on a disk or other storage means, called the "QRS file" in the preferred embodiment. This file also provides the keywords recognized by the equation lexical scanner/parser, described below.

The palette window also serves as a visual aid to inexperienced users. When the palette window is activated, a message is displayed at the bottom of the screen describing in some detail the keyword that will be inserted into the textual description when the symbol or command highlighted is selected. Thus, a major purpose of the palette window is to provide a learning tool whereby the user has the flexibility to choose the method most applicable to his style or experience with the wordprocessor. The new user, being unfamiliar with equation editing commands and seldom-used mathematical characters, will likely use the palette as his principal mode of entry. By providing on-screen display of many available commands and characters, the palette window reduces the need to resort to written documentation, which is advantageous in the keyboard-intensive task of wordprocessing. For example, rather than entering the Greek letter "α" into the textual description directly from within the editing window by typing either the word "alpha" or the extended character sequence "Control-2,8,1", the new user might access the palette window, find the "α" character and enter it from the palette. When he becomes familiar enough with the character or command, he will eventually enter it directly from the editing window.

Referring to FIG. 2, the third window in the equation editor is the display window 3. The display window displays equations as they appear in their final printed form. At any time while the textual description of an equation is being edited in the editing window, the equation may be displayed in the display window in its current for by pressing a pre-defined key, e.g., F9 or "Control-F3" in the currently preferred embodiment. The equation is displayed by using a combination of lexical scanning, parsing, and display techniques well known in the art, as follows.

First, the textual description of the equation in memory is lexically scanned, i.e., it is dissected into a sequence of "tokens" of which the equation editor grammar is composed. Tokens consist of all keywords, characters, and extended characters that may be used to construct the textual description of an equation, e.g., "ROOT", "SUP", "ALPHA", "+", "−", "x", "y", "z", "α" and "β". In the preferred embodiment, the equation editor grammar is composed of the ASCII keyboard characters, the extended characters in Table 1, and the keywords representing commands and symbols shown in Table 2. Each token in the equation editor grammar has a unique value which is stored in a file called the "QRS file." The lexical scanner matches each token with its corresponding value found in the QRS file and passes the value to the parser. Thus, for example, for each valid keyword in the textual description, the lexical scanner locates its corresponding value in the QRS file and when a match is found passes the unique value assigned to the keyword in the QRS file to the parser. If the scanner encounters a token which is an extended character, it passes the extended character value contained in the QRS file to the parser. Thus, if the token "alpha" is encountered in the textual description, the scanner will look up and find "alpha" in the QRS file and cause the return of "8,1," which is the extended character value of the alpha symbol, α, in the Greek character set.

Next, after the lexical scanner returns the character and keyword values of the textual description to the parser, the parser generates a binary tree-type data structure describing the equation to be built in memory according to a set of grammar rules. The use of such grammar rules in the likes of compilers, interpreters and language translators is well known in the computer art. The equation editor grammar rules essentially define all sequences of tokens from which an equation can be properly constructed. Thus, for example, a textual description of the form "a+b" would be recognized by the grammar rules as valid while "ab+" would not be valid.

After the full textual description has been scanned, the tree is complete (if the textual description contained no syntax errors). Each node of the tree data structure is then analyzed and formatted with regards to the appearance, font, placement (i.e., (x,y) location), and actual symbols to output. For example, if a node contained a "SQRT" command, information pertaining to the size and placement of the square root symbol would be determined and stored. Finally, after each node has been analyzed and the format information stored, the tree is traversed again to output the individual text nodes in their correct position and appearance either in the display window or on paper.

While the displayed equation is initially presented in a default size, e.g., 500% of its size on a printed page in the currently preferred embodiment, it may be viewed in the display window in scaled sizes ranging from 25% to 1000% of the actual printed size by pressing the "Page Down" key to decrease its size in 25% increments and pressing the "Page Up" key to increase its size in 25% increments. The displayed equation may also be moved relative to the display window ("panned") by pressing the arrow key which points in the desired direction of the move. Scaling and panning of the displayed equation are accomplished by modifying the graphical screen coordinates of the displayed equation using a combination of display techniques well known in the art, as follows.

The scaling and panning of the equation is called a transformation and is described by either a $3 \times 3$ transformation matrix or an equivalent set of calculations describing the (x,y) coordinate locations of the equation in the display. To change the view of the equation, the transformation matrix or calculations associated with the equation are recalculated according to the desired panning or scaling of the displayed equation. The use of transformation matrices to scale and pan graphically displayed data is a technique well known in the art.

As an example, referring again to FIG. 2, the equation $$f(x) = \sqrt{\frac{x^2}{2\alpha}}$$

can be created and displayed as follows. While in the editing window of the equation editor, the user would first type "FUNC" to indicate that the letter to follow is to be printed in "function" format (non-italicized). Alternatively, the user could select the "FUNC" command from the palette window command menu. Next, since the characters in "f(x)=" are all keyboard characters, they are simply typed into the editing window directly from the keyboard. The square root symbol is created by either typing "SQRT" or selecting it from the palette window. Next, the textual description of the expression inside the square root symbol $$\frac{x^2}{2\alpha}$$

can be created by typing "{xSUP 2 OVER {2 alpha)}." Brackets are used to group the expressions. Of course, the "OVER" command can also be entered by selecting it from the palette window, the "x SUP 2" can also be inserted by using the "∧" character, e.g., "x 2", and "α" can also be inserted into the equation by typing the extended character code "Control-2,8,1" or selecting it from the palette window.

After entering the textual description for this equation, the printed form of the equation can be displayed in the display window above the editing window by pressing a pre-defined key, e.g., F9 or "Control-F3" in the preferred embodiment. The display is created by sending the display data contained in the binary tree-type data structure, described above, to the computer's display memory to be displayed on the computer screen.

While displaying the equation, its textual description can be modified to change the appearance of the equation if desired. For example, "alpha" can be replaced by "beta" by simply moving the cursor in the editing window and inserting beta into the textual description of the equation as "FUNC f(x)=SQRT {x ∧2 OVER {2 beta}" to produce the equation $$f(x) = \sqrt{\frac{x^2}{2\beta}}$$

Thus, when "alpha" is replaced by "beta," the tree-type data structure describing the equation is recreated from the changed textual description of the equation so that "α" is replaced by "β" in the display.

The present invention thus uniquely combines multiple equation editing components into a single user interface, including an editing window for manipulating the textual description of an equation, a display window for viewing the printed form of the equation, and a palette window for selecting symbols and commands used in editing the equation. This invention presents a uniquely efficient and flexible method for creating and editing mathematical equations in printed documents.

Table 1

```
Character Set 0 (ASCII)
                        1                   2
       0 1 2 3 4 5 6 7 8 9 0 1 2 3 4 5 6 7 8 9 0 1 2 3 4 5 6 7 8 9
   0
  30             ! " # $ % & ' ( ) * + , - . / 0 1 2 3 4 5 6 7 8 9 : ;
  60   < = > ? @ A B C D E F G H I J K L M N O P Q R S T U V W X Y
  90   Z [ \ ] ^ _ ` a b c d e f g h i j k l m n o p q r s t u v w
 120   x y z { | } ~

Character Set 1 (Multinational 1)
                        1                   2
       0 1 2 3 4 5 6 7 8 9 0 1 2 3 4 5 6 7 8 9 0 1 2 3 4 5 6 7 8 9
   0   ` · ¯ ^ - / ˘ ˙ ¨ ' " ˚  , ˝ ˛ ˇ   ˜ ¯ ˘  ß ı ɟ Ã á Â â
```

```
30  Ä ä À à Å å Æ æ Ç ç É é Ê ê Ë ë È è Í í Î î Ï ï Ì ì Ñ ñ Ó ó
60  Ô ô Ö ö Ò ò Ú ú Û û Ù ù Ü ü Ù ù Ÿ ÿ Ã ã Ð ð Ø ø Õ õ Ý ý Đ đ Þ þ
90  Ă ă Ā ā Ą ą Ć ć Č č Ĉ ĉ Ċ ċ Ď ď Ĕ ĕ Ė ė Ē ē Ę ę Ğ ğ Ĝ ĝ Ğ ğ
120 Ģ ģ Ĝ ĝ Ġ ġ Ĥ ĥ Ħ ħ Ĭ ĭ Ī ī Į į Ĩ ĩ IJ ij Ĵ ĵ Ķ ķ Ĺ ĺ Ļ ļ
150 Ľ ľ Ŀ ŀ Ł ł Ń ń Ň ň Ņ ņ Ŋ ŋ Ŏ ŏ Ō ō Ő ő Œ œ Ŕ ŕ Ř ř Ŗ ŗ Ś ś Š š Ş ş
180 Ŝ ŝ Ť ť Ţ ţ Ŧ ŧ Ŭ ŭ Ū ū Ű ű Ų ų Ů ů Ũ ũ Ŵ ŵ Ŷ ŷ Ź ź Ž ž Ż ż
210 Ŋ ŋ Ḋ ḋ Ḹ ḹ Ñ ñ Ṙ ṙ Ṡ ṡ Ṫ ṫ Ẏ ẏ Ỳ ỳ Ḍ ḍ Ḋ ḋ
```

Character Set 2 (Multinational 2)

```
        0 1 2 3 4 5 6 7 8 9 0 1 2 3 4 5 6 7 8 9 0 1 2 3 4 5 6 7 8 9
0       . . . . ' . _ _ K . . . . . . . . L . . . . . . . . ' ' "
```

Character Set 3 (Box Drawing)

```
        0 1 2 3 4 5 6 7 8 9 0 1 2 3 4 5 6 7 8 9 0 1 2 3 4 5 6 7 8 9
0       ▓ ▓ ▓ █ ▌ ▀ ▐ ▄ - | ┌ ┐ ┘ └ ├ ┬ ┤ ┴ + = ║ ╔ ╗ ╝ ╚ ╠ ╦ ╣ ╩ ╬
30      ╒ ╕ ╛ ╘ ╓ ╖ ╜ ╙ ╟ ╤ ╢ ╧ ╝ ╪ ╫ - | - | = ║ = ║ < > ħ Ψ
60      ├ ╟ ├ ╟ ┬ ╤ ┬ ╤ ┤ ╢ ┤ ╢ ┴ ╧ ┴ ╧ + ╪ + ╪ ┼ ╫ + ╫
```

Character Set 4 (Typographic Symbols)

```
        0 1 2 3 4 5 6 7 8 9 0 1 2 3 4 5 6 7 8 9 0 1 2 3 4 5 6 7 8 9
0       • ○ ■ • . . ¶ § ¡ ¿ « » £ ¥ ₧ ƒ ª º ½ ¼ ¢ ² ⁿ ® © ¤ ¾ ³ ' ' '
```

Table 1
~~Figure 3.~~ Extended Character Set (p. 1)

```
30   ' " " - — ‹ › o □ † ‡ ™ ▪ ℞ ● • ■ ▫ □ ▫ - ff ffi ffl fi fl … $ ₣ ₲
60   ₡ £ , „ ⅛ ⅜ ⅝ ⅞ ● ◦ • % ‰ № - ¹ □ □ □ □ □ □
```

Character Set 5 (Iconic Symbols)

```
        0 1 2 3 4 5 6 7 8 9 0 1 2 3 4 5 6 7 8 9 0 1 2 3 4 5 6 7 8 9
0       ♥ ♦ ♣ ♠ ♂ ♀ ☼ ☺ ● ♪ ♫ _ △ ‼ ✓ ‡ — – ☐ ■ ↵ ☛ ☞ ✓ ☐ ■ ⊕ ♯ ♭ ♮
30      ✈ ⊖ ✗ € ␣
```

Character Set 6 (Math/Scientific)

```
        0 1 2 3 4 5 6 7 8 9 0 1 2 3 4 5 6 7 8 9 0 1 2 3 4 5 6 7 8 9
0       - ± ≤ ≥ ∝ / / \ ÷ | ⟨ ⟩ - ≈ ■ ∈ ∩ ‖ Σ ∞ ⟶ → ← ↑ ↓ ↔ ↕ ▶ ◀ ▲
30      ▼ · · ∘ • Å • μ ⁻ × ∫ Π ∓ ∇ ∂ ′ ″ ‾ e ℓ ℏ ℑ ℜ ℘ ⇌ ⇋ ⇒ ⇐ ⇑ ⇓
60      ↔ ↕ ↗ ↖ ↘ ↙ ∪ ⊂ ⊃ ⊆ ⊇ ∋ ∅ ⌈ ⌉ ⌊ ⌋ ◀ ▶ ∠ ⊗ ⊕ ⊖ ⊘ ⊙ ∧ ∨ ⊻ ⊤ ⊥
90      ⌢ ⊢ ⊣ □ ■ ◇ ◆ [ ] ≠ ≢ ⋮ ⋰ ⋱ ∷ § ℒ ℭ ℨ ℘ ○ △ ◇ ★ ″ ⫲ ≃ ≡ ≺ ≼ ≻
120     ≽ ∃ ∀ ⊲ ⊳ ⊎ ⊑ ⊐ ∩ ⊏ ⊑ ⊒ ⊐ ⊐ ⊒ △ ▽ ◁ ▷ ⋈ ⌣ ⌢ ⟲ ↝ ↜ ↠ ↞ —
150     - - ↦ ↤ ↥ ↧ ↨ ↦ ⊨ ⊭ ∪ ∩ ⊂ ⊃ ● ● ● Ů △ ◁ ◁ ▷ △ ▽ ± ∓ ∗ ≠ ∘ ×
180     ⊨ ▲ ∥ \ ★ ⋆ ≾ ≿ ≴ ≵ ∔ ∸ ∗ ∹ ∻ ≃ ≟ ℭ 𝒟 ℯ ℊ ℋ ℐ ℒ ∥ ⁄ ✱ ∃ ∉
210     ⋆ ℰ 𝒥 C I N R ² ⌞ ∋ ⋯ … ∶ ∵ ‾ ‾ + - ≠ ∗ ⁄ ∫ ∫ ℋ 𝒫
```

Character Set 7 (Math/Scientific Extension)

```
        0 1 2 3 4 5 6 7 8 9 0 1 2 3 4 5 6 7 8 9
```

Table 1
Figure 3. Extended Character Set (p. 2)

Character Set 8 (Greek)

```
             1                   2
  0 1 2 3 4 5 6 7 8 9 0 1 2 3 4 5 6 7 8 9 0 1 2 3 4 5 6 7 8 9
0  A α B β B ϐ Γ γ Δ δ E ε Z ϛ H η Θ θ I ι K κ Λ λ M μ N ν Ξ ξ
30 O o Π π P ρ Σ σ Σ ς T τ Y υ Φ φ X χ Ψ ψ Ω ω ά έ ή ί ϊ ό ύ ϋ
60 ώ ε ϑ ϰ ϖ ϱ Τ φ ϐ ; · ᾿ ῀ ῁ ᾿ · · · · · · · · · · · · · ·
90 · · · · · · · ἀ ἂ ᾳ ᾄ ᾂ ἀ ἄ ἂ ἀ ᾳ ᾄ ᾂ ἀ ᾳ ᾄ ᾂ ἐ ἔ ἔ ἔ
120 ἐ ἔ ἐ ἠ ἤ ῃ ῄ ῂ ῃ ἠ ἤ ἢ ἠ ῃ ῄ ῂ ῃ ἠ ἤ ἢ ἠ ῃ ῄ ῂ ἰ ἴ ἲ ἰ ἴ ἲ
150 ἰ ἰ ἰ ἰ ἰ ὀ ὂ ὄ ὂ ὀ ὄ ὂ ὐ ὒ ὔ ὒ ὐ ὔ ὒ ὐ ὒ ὔ ὒ ὐ ὠ ὤ ᾠ ᾤ ᾢ
180 ὠ ὤ ὢ ὠ ᾠ ᾤ ᾢ ὠ ὤ ὢ ὠ ᾤ ᾢ ' ͺ Ϛ Ϝ Ϙ Ϡ Α Ε Η Ι Ο Υ Ώ Ϊ Ϋ ϸ
```

Character Set 9 (Hebrew)

```
             1                   2
  0 1 2 3 4 5 6 7 8 9 0 1 2 3 4 5 6 7 8 9 0 1 2 3 4 5 6 7 8 9
0  א ב ב ג ד ה ו ז ח ט י כ ך ל מ ם נ ן ס ע פ ף צ ץ ק ר ש ת ב ב
30 פ
```

Table 1
Figure 3. Extended Character Set (p. 3)

Character Set 10 (Cyrillic)

```
         1                   2
0 1 2 3 4 5 6 7 8 9 0 1 2 3 4 5 6 7 8 9 0 1 2 3 4 5 6 7 8 9
0   А а Б б В в Г г Д д Е е Ё ё Ж ж З з И и Й й К к Л л М м Н н
30  О о П п Р р С с Т т У у Ф ф Х х Ц ц Ч ч Ш ш Щ щ Ъ ъ Ы ы Ь ь
60  Э э Ю ю Я я Ґ ґ Ђ ђ Ѓ ѓ Є є Ѕ ѕ І і Ї ї Ј ј Љ љ Њ њ Ћ ћ Ќ ќ
90  Ў ў Џ џ Ѣ ѣ Ѳ ѳ V v Ҳ ҳ
```

Character Set 11 (Hiragana and Katakana)

```
         1                   2
0 1 2 3 4 5 6 7 8 9 0 1 2 3 4 5 6 7 8 9 0 1 2 3 4 5 6 7 8 9
0   ぁ い ぅ ぇ ぉ っ ゃ ゅ ょ ゎ か け あ い う え お か が き ぎ く ぐ け げ こ ご さ し
30  ざ じ ず ぜ ぞ じ す ぜ ぞ た ち つ っ て と だ ぢ づ で ど な に ぬ ね の は ひ ふ へ ほ ば ぴ ぶ
60  べ ぼ ぱ ぴ ぷ ぺ ぽ ま み む め も や ゆ よ ら り る れ ろ わ を ん [ ] [ ] 「 」 「
90  」 . . . ` ´ ・ ー ゛ ゜ ア イ ウ エ オ ッ ャ ュ ョ ヴ カ ケ ア イ ウ エ オ カ キ ク
120 ケ コ ガ ギ グ ゲ ゴ サ シ ス セ ソ ザ ジ ズ ゼ ゾ タ チ ツ テ ト ダ ヂ ヅ デ ド ナ ニ ヌ
150 ネ ノ ハ ヒ フ ヘ ホ バ ビ ブ ベ ボ パ ピ プ ペ ポ マ ミ ム メ モ ヤ ユ ヨ ラ リ ル レ ロ
180 ワ ヲ ン ヽ ヾ
```

Table 1. Extended Character Set (p. 4)

Table 2

ARROWS

| | | | |
|---|---|---|---|
| ↓ | Down Arrow | ↦ | Maps To |
| ↔ | Left & Right Arrow | ◁ | Triangle Left |
| ↕ | Up & Down Arrow | ▷ | Triangle Right |
| ⇇ | Two Left Arrows | △ | Triangle Up |
| ⇉ | Two Right Arrows | ▽ | Triangle Down |
| ⇆ | Left & Right Arrows | ◂ | Small Triangle Left |
| ⇄ | Right & Left Arrows | ▸ | Small Triangle Right |
| ⇐ | Double Left Arrow | ▲ | Big Triangle Up |
| ⇒ | Double Right Arrow | ▼ | Big Triangle Down |
| ⇑ | Double Up Arrow | ◀ | Solid Triangle Left |
| ⇓ | Double Down Arrow | ▶ | Solid Triangle Right |
| ⇔ | Double Left & Right Arrow | ▴ | Solid Triangle Up |
| ⇕ | Double Up & Down Arrow | ▾ | Solid Triangle Down |
| ↗ | North East Arrow | ≜ | Defined As |
| ↘ | South East Arrow | ≙ | Corresponds To |
| ↙ | South West Arrow | ⋈ | Bow Tie |
| ↖ | North West Arrow | ☆ | Solid Star |
| ↪ | Curly Right Arrow | ★ | Big Solid Star |
| ↼ | Left Harpoon Up | ○ | Diamond |
| ↽ | Left Harpoon Down | ◆ | Solid Diamond |
| ⇀ | Right Harpoon Up | ◇ | Hollow Diamond |
| ⇁ | Right Harpoon Down | ◯ | Big Circle |
| ⇋ | Left & Right Harpoons | ○ | Circle |
| ⇌ | Right & Left Harpoons | ∘ | Small Circle |
| ↿ | Up Harpoon Left | • | Small Solid Circle |
| ↾ | Up Harpoon Right | □ | Square |
| ⇃ | Down Harpoon Left | ■ | Solid Square |
| ⇂ | Down Harpoon Right | | |
| ↩ | Hook Left Arrow | | |
| ↪ | Hook Right Arrow | | |

Table 2. Palette Window Menus (p. 1)

COMMANDS

| Keyword | Function | Syntax |
|---------|----------|--------|
| OVER | Fraction | x OVER y |
| SUP or ^ | Superscript | x SUP y or x^y |
| SUB or _ | Subscript | x SUB y or x_y |
| SQRT | Square root | SQRT x |
| NROOT | Nth root | NROOT n x |
| FROM | Limits | x FROM y TO z |
| TO | Limits | x FROM y TO z |
| LEFT | Left delimiter | LEFT delimiter |
| RIGHT | Right delimiter | RIGHT delimiter |
| STACK | Vertical stack | STACK {x#y} |
| STACKALIGN | Vertical stack with character alignment | STACKALIGN {x&y # a&b} |
| MATRIX | Matrix | MATRIX {x&y # a&b} |
| FUNC | User function | FUNC name |
| UNDERLINE | Underline | UNDERLINE x |
| OVERLINE | Overline | OVERLINE x |
| { | Start group | {x+2} |
| } | End group | {x+2} |
| HORZ | Horizontal move | HORZ n |
| VERT | Vertical move | VERT n |
| ~ | Normal space | x~y |
| ` | Thin space (¼ normal space) | x`y |
| BINOM | Binomial | BINOM x y |
| & | Column separator | x & y |
| # | Row separator | x # y |
| MATFORM | Matrix column format | MATFORM {ALIGNx & ALIGNx &...& ALIGNx} |
| ALIGNL | Align left | ALIGNL x |
| ALIGNR | Align right | ALIGNR x |
| ALIGNC | Align center | ALIGNC x |
| PHANTOM | Place holder | PHANTOM x |
| . | No delimiter | LEFT . |
| \ | Literal | \x |
| BOLD | Bold attribute | BOLD x |
| ITAL | Italic attribute | ITAL x |
| OVERSM | Fraction small | x OVERSM y |
| BINOMSM | Binomial small | BINOMSM x y |

Table 2. Palette Window Menus (p. 2)

FUNCTIONS

| Keyword | Description |
|---------|-------------|
| cos | Cosine |
| sin | Sine |
| tan | Tangent |
| arccos | Arc cosine |
| arcsin | Arc sine |
| arctan | Arc tangent |
| cosh | Hyperbolic cosine |

| | |
|---|---|
| sinh | Hyperbolic sine |
| tanh | Hyperbolic tangent |
| cot | Cotangent |
| coth | Hyperbolic cotangent |
| sec | Secant |
| cosec | Cosecant |
| exp | Exponent |
| log | Logarithm |
| ln | Natural logarithm |
| lim | Limit |
| liminf | Limit inferior |
| limsup | Limit superior |
| min | Minimum |
| max | Maximum |
| gcd | Greatest common denominator |
| arc | Arc function |
| det | Determinant |
| mod | Modulo |

Table 2
~~Figure 4.~~ Palette Window Menus (p. 3)

GREEK

| Symbol | Keyword | Symbol | Keyword |
|---|---|---|---|
| α | alpha | ω | omega |
| β | beta | A | ALPHA |
| γ | gamma | B | BETA |
| δ | delta | Γ | GAMMA |
| ϵ | epsilon | Δ | DELTA |
| ε | varepsilon—epsilon (variant) | E | EPSILON |
| ζ | zeta | Z | ZETA |
| η | eta | H | ETA |
| θ | theta | Θ | THETA |
| ϑ | vartheta—theta (variant) | I | IOTA |
| ι | iota | K | KAPPA |
| κ | kappa | Λ | LAMBDA |
| λ | lambda | M | MU |
| μ | mu | N | NU |
| ν | nu | Ξ | XI |
| ξ | xi | O | OMICRON |
| ο | omicron | Π | PI |
| π | pi | P | RHO |
| ϖ | varpi—pi (variant) | Σ | SIGMA |
| ρ | rho | T | TAU |
| ϱ | varrho—rho (variant) | Y | UPSILON |
| σ | sigma | Φ | PHI |
| ς | varsigma—sigma (variant) | X | CHI |
| τ | tau | Ψ | PSI |
| υ | upsilon | Ω | OMEGA |
| φ | phi | | |
| ϕ | varphi—phi (variant) | | |
| χ | chi | | |
| ψ | psi | | |

Table 2
~~Figure 4.~~ Palette Window Menus (p. 4)

Large

| Symbol | Keyword | Description |
|---|---|---|
| Σ | SUM | Summation |
| Σ | SMALLSUM | Small Sum |
| ∫ | INT | Integral |
| ∫ | SMALLINT | Small Integral |
| ∮ | OINT | Contour Integral |
| ∮ | SMALLOINT | Small Contour Integral |
| Π | PROD | Product |
| Π | SMALLPROD | Small Product |
| ⨿ | COPROD | Coproduct |
| ⨿ | SMALLCOPROD | Small Coproduct |
| ∩ | CAP | Intersection |
| ∩ | BIGCAP | Big Intersection |
| ∪ | CUP | Union |
| ∪ | BIGCUP | Big Union |
| ⊎ | UPLUS | Multiset Union (U Plus) |
| ⊎ | BIGUPLUS | Big U Plus |
| ⊓ | SQCAP | Square Intersection |
| ⊓ | BIGSQCAP | Big Square Intersection |
| ⊔ | SQCUP | Square Union |
| ⊔ | BIGSQCUP | Big Square Union |
| ∨ | OR | Logical Or |
| ∨ | BIGVEE | Big Vee |
| ∧ | AND | Logical And |
| ∧ | BIGWEDGE | Big Wedge |
| ⊕ | OPLUS | Circle Plus |
| ⊕ | BIGOPLUS | Big Circle Plus |
| ⊖ | OMINUS | Circle Minus |
| ⊖ | BIGOMINUS | Big Circle Minus |
| ⊗ | OTIMES | Circle Multiply |
| ⊗ | BIGOTIMES | Big Circle Multiply |
| ⊘ | ODIV | Circle Divide |
| ⊘ | BIGODIV | Big Circle Divide |
| ⊙ | ODOT | Circle Dot |
| ⊙ | BIGODOT | Big Circle Dot |
| ( | ( | Left Parenthesis |
| ) | ) | Right Parenthesis |
| [ | [ | Left Bracket |
| ] | ] | Right Bracket |
| [ | LDBRACK | Left Double Bracket |
| ] | RDBRACK | Right Double Bracket |
| { | LBRACE | Left Brace |
| } | RBRACE | Right Brace |
| ⌊ | LFLOOR | Left Floor |
| ⌋ | RFLOOR | Right Floor |
| ⌈ | LCEIL | Left Ceiling |
| ⌉ | RCEIL | Right Ceiling |
| ⟨ | LANGLE | Left Angle |
| ⟩ | RANGLE | Right Angle |
| | | LINE | Vertical Line |
| ‖ | DLINE | Double Vertical Line |

Table 2. Palette Window Menus (p. 5)

SETS

| Symbol | Keyword | Description |
|---|---|---|
| \ | SETMINUS | Set Minus (figure backslash) |
| ⊂ | SUBSET | Proper Subset |
| ⊃ | SUPSET | Proper Superset |
| ⊆ | | Reflex Subset (contained in) |
| ⊇ | | Reflex Superset (contains) |
| ⊊ | | Subset But Not Equal |
| ⊋ | | Superset But Not Equal |
| ⊏ | SQSUBSET | Square Proper Subset |
| ⊐ | SQSUPSET | Square Proper Superset |
| ⊑ | | Square Reflex Subset |
| ⊒ | | Square Reflex Superset |
| ⊏ | | Square Subset, Not Equal |
| ⊐ | | Square Superset, Not Equal |
| ∈ | IN | Member (element) |
| ∉ | NOTIN | Not a Member |
| ∋ | OWNS | Owns (contains as a member) |
| ∅ | EMPTYSET | Empty Set |
| ⋓ | | Double Union |
| ⋒ | | Double Intersection |
| ⋐ | | Double Subset |
| ⋑ | | Double Superset |
| ⊄ | | Not Subset |
| ⊅ | | Not Superset |
| ⊈ | | Not Reflex Subset |
| ⊉ | | Not Reflex Superset |
| ⋢ | | Square Not Subset |
| ⋣ | | Square Not Superset |
| ⋤ | | Square Not Reflex Subset |
| ⋥ | | Square Not Reflex Superset |
| ≮ | | Not Less Than |
| ≰ | | Not Less Than or Equal |
| ≯ | | Not Greater Than |
| ≱ | | Not Greater Than or Equal |
| ≁ | | Not Similar |
| ≄ | | Not Similar or Equal |
| ≇ | | Not Congruent |
| ≉ | | Not Approximately Equal |
| ⊀ | | Does Not Precede |
| ⋠ | | Neither Precedes nor Equals |
| ⊁ | | Does Not Follow |
| ⋡ | | Neither Follows nor Equals |
| ∦ | | Not Parallel |
| ∤ | | Does Not Divide |
| ∄ | | There Never Exists |
| ℜ | REAL | Real (R Fraktur) |
| ℑ | IMAG | Imaginary (I Fraktur) |

Table 2. Palette Window Menus (p. 6)

SETS

| Symbol | Keyword | Description |
|---|---|---|
| ℭ | | C Fraktur |
| ℨ | | Z Fraktur |
| ℘ | | Weierstrass |
| ℘ | | Capital Weierstrass |

| Symbol | | Description |
|---|---|---|
| ℏ | | Planck's Constant |
| ℒ | | Laplace Transform (Script L) |
| ℰ | | Script E |
| ℱ | | Fourier Transform (Script F) |
| ℂ | | Complex Number (Hollow C) |
| 𝕀 | | Integer (Hollow I) |
| ℕ | | Natural Number (Hollow N) |
| ℝ | | Real Number (Hollow R) |
| ℧ | MHO | Mho |
| Å | ANGSTROM | Angstrom |

Table 2. Palette Window Menus (p. 7)

Symbols

| Symbol | Keyword | Description |
|---|---|---|
| ′ | ' | Prime |
| ″ | '' | Double Prime |
| ‴ | ''' | Triple Prime |
| ∞ | INF (INFINITY) | Infinity |
| ∂ | PARTIAL | Partial Derivative |
| ∇ | GRAD | Nabla (Gradient) |
| × | TIMES | Multiplication Sign (x) |
| ÷ | DIV | Division Sign |
| ± | +- (PLUSMINUS) | Plus Or Minus |
| ∓ | -+ (MINUSPLUS) | Minus Or Plus |
| · | CDOT | Center Dot |
| ∨ | XOR | Logical Exclusive Or |
| ≤ | <= | Less Than Or Equal |
| ≥ | >= | Greater Than Or Equal |
| ≪ | << | Much Less Than |
| ≫ | >> | Much Greater Than |
| ⋘ | LLL | Much Much Less |
| ⋙ | GGG | Much Much Greater |
| ≠ | != | Not Equal |
| ¬ | NOT | Logical Not |
| ≺ | PREC | Precedes |
| ≻ | SUCC | Succeeds (Follows) |
| ≼ | PRECEQ | Precedes Or Equals |
| ≽ | SUCCEQ | Succeeds (Follows) Or Equals |
| ≡ | == | Equivalent |
| ≢ | NEQUIV | Not Equivalent |
| ∼ | SIM | Similar |
| ≃ | SIMEQ | Similar Or Equal |
| ≈ | APPROX | Approximately Equal |
| ≅ | CONG | Congruent |
| ∝ | PROPTO | Proportional To |
| ≐ | DOTEQ | Equal by Definition |
| ∥ | PARALLEL | Parallel |
| ⊥ | PERP | Perpendicular To |
| ∀ | FORALL | For All |
| ∃ | EXISTS | There Exists |
| ∴ | THEREFORE | Therefore |
| ∵ | BECAUSE | Because |
| ∷ | IDENTICAL | Identical |
| ⊕ | DSUM | Direct Sum (Dot Plus) |
| ≟ | QEQUAL | Questioned Equality |
| ≒ | IMAGE | Image (Falling Dots Equals) |
| ≓ | RIMAGE | Reverse Image |
| ≗ | ISO | Isomorphic |
| ≇ | NISO | Not Isomorphic |
| ≍ | ASYMEQ | Asymptotically Equivalent |

Table 2. Palette Window Menus (p. 8)

We claim:

1. An equation editing system implemented on a digital computer for enabling a user to edit a mathematical equation to be placed in a document and to display the equation as it would appear in final printed form, the system comprising:
   (a) display means comprising an editing window, a palette window and a display window;
   (b) memory means;
   (c) microprocessor means;
   (d) storage means;
   (e) input means including a standard computer keyboard whereby a user can enter a textual description of the equation;
   (f) a first portion of the memory means being adapted to store the textual description of each element of the equation entered by the user;
   (g) the editing window being associated with the memory means and being adapted to display the textual description of each element of the equation as it is entered by a user;
   (h) a second portion of the memory means being adapted to store predefined keywords in an equation editor grammar that may be used to construct the textual description, the grammar being composed of tokens which include the keywords;
   (i) parser means containing stored grammar rules describing sequences in which the tokens of the textual description may be combined;
   (j) lexical scanning means for causing the microprocessor to successively compare tokens of the stored textual description with the keywords and, when a token corresponds to one of the keywords, for passing a unique value representing the token to the parser means;
   (k) the parser means being adapted to receive keywords from the lexical scanning means, process those keywords according to the stored grammar rules and generate data structures describing the appearance of the equation in a printed document and the display window;
   (l) means for causing the equation to be displayed in the display window;
   (m) the palette window containing multiple selectable menus which enable a user to use the input means to select keywords for editing said textual descriptions; and
   (n) means for causing the display means to display the mathematical equation in the display window simultaneously with the textual description of said mathematical equation in the editing window.

2. The system of claim 1 wherein the keywords and entries in the palette window menus are stored in the storage means.

3. The system of claim 1 further including means for permitting a user to activate the display means windows in any sequence.

4. The system of claim 1 wherein the size and location of the equation in the display window of the display means can be changed.

* * * * *